United States Patent [19]

Maki

[11] Patent Number: 5,557,524
[45] Date of Patent: Sep. 17, 1996

[54] GPS/GLONASS TRAVEL RECORDER

[76] Inventor: Stanley C. Maki, 4966 "A" Waring Rd., San Diego, Calif. 92120

[21] Appl. No.: 130,013

[22] Filed: Sep. 30, 1993

Related U.S. Application Data

[63] Continuation-in-part of Ser. No. 780,702, Oct. 18, 1991, abandoned.

[51] Int. Cl.$^6$ .......................... G06F 17/40; G06F 157/00
[52] U.S. Cl. .................. 364/424.04; 364/406; 364/449; 342/457; 340/995
[58] Field of Search .................................. 364/449, 452, 364/467, 434, 562, 444, 424.04, 460, 406, 401; 342/357, 457; 340/995, 944; 395/161, 600

[56] References Cited

U.S. PATENT DOCUMENTS

| | | | |
|---|---|---|---|
| 4,514,810 | 4/1985 | Ito et al. | 364/424 |
| 4,535,335 | 8/1985 | Tagami et al. | 340/995 |
| 4,563,685 | 1/1986 | Matsumoto et al. | 340/995 |
| 4,807,157 | 2/1989 | Fukushima et al. | 364/521 |
| 4,875,167 | 10/1989 | Price et al. | 364/424.04 |
| 4,903,212 | 2/1990 | Yokouchi et al. | 364/449 |
| 5,087,919 | 2/1992 | Odagawa et al. | 342/357 |
| 5,089,826 | 2/1992 | Yano et al. | 342/457 |
| 5,170,164 | 12/1992 | Lewis | 340/988 |
| 5,170,165 | 12/1992 | Iihoshi et al. | 340/995 |
| 5,214,757 | 5/1993 | Mauney et al. | 395/161 |
| 5,337,236 | 8/1994 | Fogg et al. | 364/424.04 |
| 5,359,528 | 10/1994 | Haendel et al. | 364/424.04 |

*Primary Examiner*—Michael Zanelli
*Attorney, Agent, or Firm*—Gilliam, Duncan, Harms

[57] ABSTRACT

A GPS/GLONASS travel recorder which utilizes the accurate position and velocity information determinable from radio frequency signals emanating from GPS and/or GLONASS satellites and ground stations to create an accurate route map by joining the frequent accurate position data points with user selectable or automatically selected route symbology. Features of the route locality are automatically printed on a displayed map of the travelled route from prior stored legends that are designated with approximate position location, or can be inserted by a user with keyboard or mouse entry. The computer processor of the GPS/GLONASS travel recorder calculates distance traveled by the carrier, time of travel, height, and other user chosen parameters that are programmed into the processor. Such data are stored for later retrieval as is the route map.

14 Claims, 3 Drawing Sheets

START — WARING ROAD NEAR INTERSTATE 8
TERMINATE — RESERVOIR DRIVE PAST SARANAC STREET
10 OCT 1991   2:40 PM — 2:57 PM

| | |
|---|---:|
| PRIOR ACCUMULATED MILES: | 25,648.7 |
| MILES THIS TRIP: | 4.8 |
| NEW ACCUMULATED MILES: | 25,653.5 |
| PRIOR ACCUMULATED TRAVEL DEDUCTION | $5,386.23 |
| TRAVEL DEDUCTION THIS TRIP @ $0.21 | $1.01 |
| NEW ACCUMULATED TRAVEL DEDUCTION | $5,387.24 |

*FIGURE 4*

GPS/GLONASS TRAVEL RECORDER

This is a continuation-in-part of application Ser. No. 07/780,702 filed on Oct. 18, 1991, now abandoned.

BACKGROUND OF THE INVENTION

The present invention relates generally to recording route travel and more specifically, but not by way of limitation, to the providing of travel route maps and travel route data in an accurate, timely, and retrievable fashion.

There are a variety of well known approaches for providing travel route data and travel route maps. The most common approach is to use pre-prepared maps and to record travel route data manually in a record book based on map reading, and sources of distance such as an odometer. Disadvantages of such an approach include the possibility of error in map location and in computing mileage.

A method used in some aircraft is to utilize a LORAN receiver which will provide direction and distance-to-waypoints. This method does not provide route maps, or easily retrievable route data.

Recently the U.S. global positioning system (GPS) has become available as an accurate navigation position and velocity sensor. Similarly, the Russian Global Satellite Navigation System (GLONASS) is expected to be available for similar purposes. However, GPS sensing is plagued by line-of-sight obscuration of the GPS satellite signals by physical objects resulting in temporary inaccuracy or drop-out of GPS satellite sensing during these periods of dropouts. Such augmenting sensor systems are known and described in U.S. Pat. No. 5,075,693 issued Dec. 24, 1991 to McMillan et al for a "PRIMARY LAND ARCTIC NAVIGATION SYSTEM", in U.S. Pat. No. 4,903,212 issued Feb. 20, 1990 to Yokouchi et al for a "GPS/SELF-CONTAINED COMBINATION TYPE NAVIGATION SYSTEM", and in U.S. Pat. No. 5,087,919 issued Feb. 11, 1992 to Odagawa et al for an "ON-BOARD NAVIGATION APPARATUS".

Some current systems utilizing GPS provide a pre-stored map which requires initialization of a known carrier/vehicle location with the same location on the map. The route of the map carrier/vehicle can then be noted on the map as the GPS satellite signals provide position information. Since the pre-stored map can be inaccurate, the vehicle location may have to be re-initialized on the map. Typically, this type of system does not provide a map readout of the route, but only the current location on the pre-stored map. Also, such systems do not provide route altitude data or percentage incline data.

Such prior art pre-stored map systems are described in U.S. Pat. No. 5,170,165 issued Dec. 8, 1992 to Iioshi et al for an "APPARATUS FOR DISPLAYING TRAVEL PATH" which uses map pattern matching to locate position on a pre-stored map, in U.S. Pat. No. 5,089,826 issued Feb. 18, 1992 to Yano et al for a "NAVIGATION SYSTEM FOR MOVABLE BODY" which uses pre-stored map scrolling to assist in position maintenance, in U.S. Pat. No. 4,807,157 issued Feb. 21, 1989 to Fukushima et al for a "METHOD OF DISPLAYING A MAP" which describes a method for digital storage of a pre-stored map and features, and the previously cited U.S. Pat. No. 5,087,919 issued to Odagawa et al which uses auxiliary navigation sensor data to correct position on a current pre-stored map.

Existing trip computer systems provide trip data information, such as speed, mileage, and time from which other trip values can be computed. These trip computer systems have utilized odometers based on pulsed output of a wheel sensor with its inherent inaccuracies. This type of system has been modified to provide accumulative numerical data for business and tax purposes by U.S. Pat. No. 4,875,167 issued Oct. 17, 1989 to Price et al for an "ODOMETER DATA COMPUTING APPARATUS".

A number of different methods have been developed for recording road feature or asset inventory data. These methods use odometer or GPS for distance measuring purposes. The feature data is stored for later retrieval. An improvement to these feature recording systems is described in U.S. Pat. No. 5,170,164 issued Dec. 8, 1992 to Lewis for an "APPARATUS AND METHOD FOR RECORDING CUSTOMIZED ROAD FEATURE DESCRIPTIONS WITH FEATURE LOCATION DATA" which permits single operator operation of the vehicle and feature recording apparatus. This apparatus uses digital audio recording and digital navigation data storage for later retrieval use. It does not provide precise real time travel route plots nor current display of user data.

Features which are not present in all known travel route data and travel route map systems utilizing GPS, or GPS with augmenting sensors, include the lack of a precise real time route traveled map display, and GPS satellite based auxiliary information for business travel income tax purposes, such as accumulated trip mileage, accumulated trip cost, and trip start and termination locations.

The purpose of this invention is then to automate and provide a precise real time travel route map display, and an accurate GPS/GLONASS based data bank of all trips that is available at the user's convenience for uses such as company business trip reimbursement, IRS travel business expense reporting, rally route and altitude and speed information and personal trip diary. This invention will reduce the user's required activity to produce such data bank records and map displays by automating the generation of route map displays and data banks. This invention is applicable to a wide range of vehicles, autos, trucks, marine vessels, aircraft, snowmobiles. tractors, motorcycles, and basically any vehicle that moves under human control and has access to the GPS or GLONASS radio frequency (RF) signals, as well as to non-vehicular carriers.

SUMMARY OF THE INVENTION

The present invention provides a novel method and arrangement for providing accurate GPS or GLONASS based, real time, current travel route horizontal map plots, and in addition makes available GPS or GLONASS based travel route height and terrain plots, travel route total velocity plots, travel route horizontal velocity component plots, and travel route vertical velocity plots, and data banks containing these plots for later retrieval and processing. The invention provides GPS or GLONASS based travel route incline grade plots, derived total component acceleration plots, and combined acceleration, velocity and position plots (e.g. acceleration component perpendicular to the total velocity vector versus total route velocity), and data banks containing these plots for later retrieval processing.

In addition, the present invention discloses a method and arrangement for provision of GPS or GLONASS based auxiliary user information data including, but not limited to, distance-to-go, accumulative business travel tax deduction, velocity-to-attain for water craft planning, records of business travel for income tax purposes, agricultural field subsidy sizing, rock strata location, travel maps, and swamp plotting.

The invention creates a map plot as the vehicle and/or non-vehicular carrier moves, by plotting the precise point-by-point position, such as, once per second, in a continuous fashion by user selectable route terminology, or by automatically selected route terminology according to its approximate latitude/longitude location in reference to the current precise latitude/longitude position data. User entry of the road type, river, trail, or other route as travel proceeds, automatically introduces the corresponding map symbology from one precise location point to the next precise location point. This invention provides pertinent information for the map plot including, but not limited to, street names, river names, beacon locations, locality names, point-of-interest names which are automatically searched out of a data file according to whether their approximate latitude/longitude location is within the user selectable range from the current precise latitude/longitude position. The present invention does not require a pre-stored map, however such a map can be provided as an overlay on the map being created, as a travel aid.

The invention provides the algorithms for computing the user information data from the basic precise current position and altitude data precise current GPS three dimensional velocity data.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

FIG. 4 is an example of a record of business travel for income tax purposes of the travel route of FIG. 3, as generated by the GPS or GLONASS utilizing system of FIG. 1.

DETAILED DESCRIPTION OF THE PREFERRED EMBODIMENT

Figure 1:
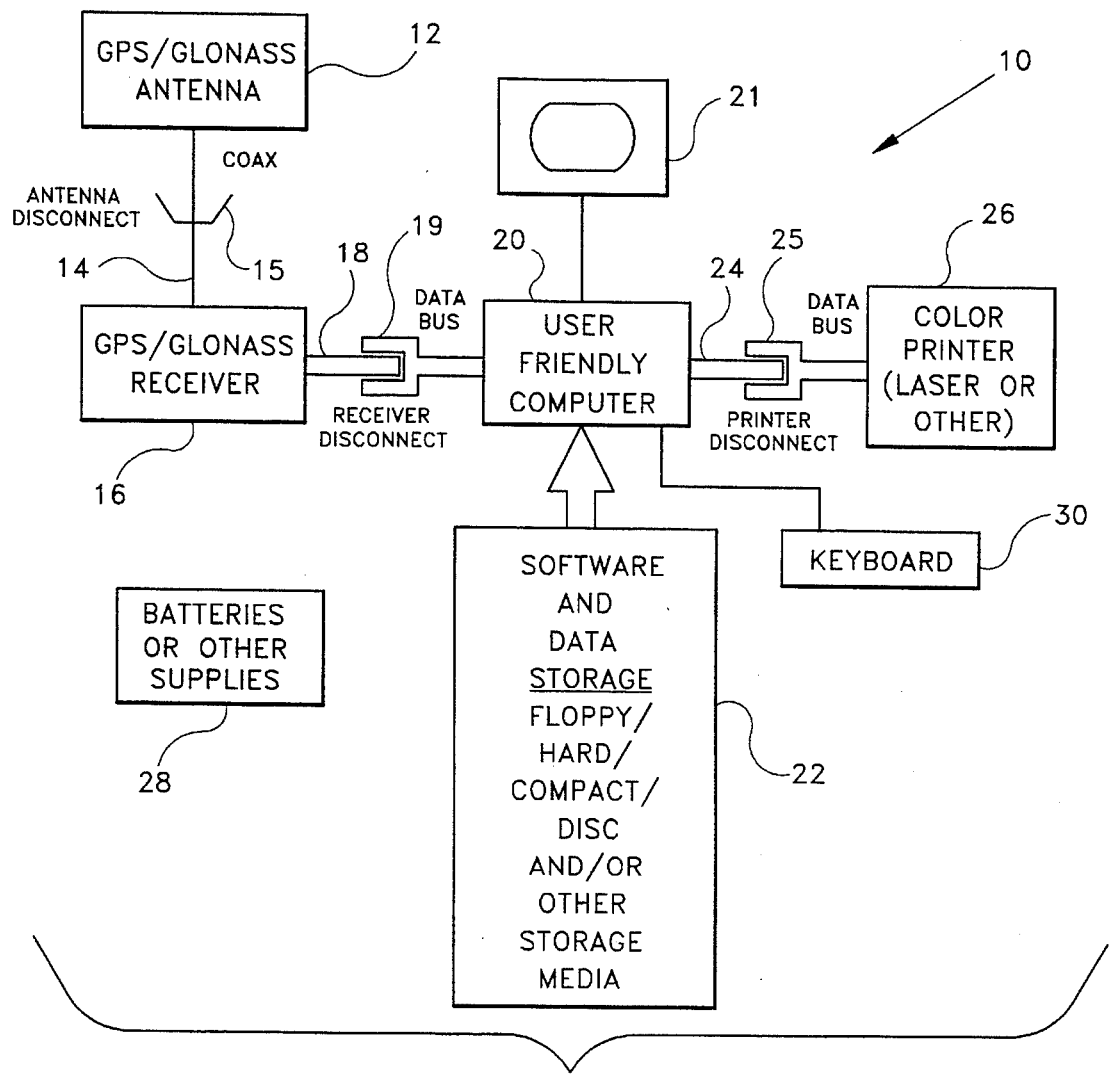
FIG. 1 is a general simplified block diagram of a GPS or GLONASS travel recorder system constructed in accordance with a preferred embodiment of the invention which can generate a travel route plot and compute the associated user data.

Referring now to the drawings in detail, and in particular to FIG. 1, reference character 10 generally designates a GPS/GLONASS utilizing travel recorder system constructed in accordance with the present invention and which integrates the standard GPS or GLONASS receiver with the additional hardware and software for creating a generated highly accurate real time travel route plot and associated user data records that is constructed in accordance with a preferred embodiment of the present invention. A suitably located GPS antenna 12 is mounted on a vehicle or other carrier (not shown) in such a fashion as to minimize multi-path effects and viewing path blockage of the GPS/GLONASS satellites and to sense the GPS/GLONASS satellite radio waves. The resulting electrical signal, which can be pre-amplified for a remote antenna location, transmitted from the antenna 12 on a coax bus 14, with a suitable disconnect 15 to facilitate assembly/disassembly, to a suitable GPS and/or GLONASS receiver 16. The GPS/GLONASS receiver 16 is preferably a continuous carrier track, C/A code receiver that precisely computes and outputs antenna 12 latitude and longitude position, antenna 12 height, and the three orthogonal velocity components of the antenna 12 in ECEF coordinates, on a data bus 18, with a suitable disconnect 19 to facilitate assembly/disassembly, to a suitable user friendly computer 20 having a suitable visual display 21. This position and velocity data is typically sent once per second to the computer 20.

The user friendly computer 20 with display 21 receives its operating instructions and processing instructions, via its own cache memory, from the floppy disc, hard disc, compact disc, or other storage media 22. The data for the route map horizontal plot is stored in such storage media 22 and is categorized by latitude and longitude data, to be searched and retrieved for the computer 20 with display 21, according to the present accurate latitude and longitude provided by the receiver 16. The storage media 22 has the feature information obtained by other means such as those described in the previously referenced U.S. Pat. No. 5,170,164 to Lewis. The storage media 22 includes an associative memory characterized by latitude and longitude which permits search for features categorized according to their approximate latitude and longitude location. These features are individually described with alpha-numerics or with a symbolic token representing the particular feature. The feature alpha-numerics or symbolic token, obtained from the storage media 22 is then placed on the display 21 of the computer 20 according to its latitude and longitude location on the map plot. The storage media 22 also contains the symbology generating instructions as requested by the user operating the computer 20 with display, or as automatically designated by symbology instructions stored according to their latitude and longitude locations.

The computer 20 with display 21 uses a commercially available vector processing program to draw a vector from a prior vehicle latitude and longitude location. The current vehicle position on the display 21 can be moved horizontally and/or vertically on the display 21 with either the mouse, or shift keys on the keyboard 30. The rest of the display moves proportionally with display X-Y coordinate drive at the proper geometric ratio, and polarity of pixels which can change the map scale of the display 21 by keyboard 30 entry of several selectable scales. The scale change is accomplished so the current vehicle position is stationary scale change. For wider vector lines, adjacent pixel vectors parallel to the original vector are swept. The vector line will be drawn on the display of the computer 20 with a user selected representation, such as heavy solid red for a freeway, a narrow solid red for an undivided paved road, and a narrow solid black line for an unsurfaced road, or a standard black line for a default representation. Since the GPS/GLONASS receiver 16 may output varying latitude and longitude position data, even if stationary, due to system noise, this step-to-step plotting is only performed if the receiver 16 also indicates a velocity measure at that time.

The storage media 22 contains those instructions for creating and generating travel route velocity plots.

The storage media 22 contains those instructions for creating and generating travel route acceleration and grade incline plots.

Also, the storage media 22 contains instructions for the algorithms for computing the user peculiar data banks, including, but not limited to, items such as accumulated trip mileage and accumulated trip business tax deduction.

To facilitate the generation of a user date record on the display 21, a commercially available spread sheet program in storage media 22 is programmed with the vector processing program stored in the data storage for computing accumulated trip mileage, business tax deduction, and trip expense deduction so the data records are automatically updated in the proper format.

The distance traveled is computed according to instructions that take the square root of the latitude, longitude, and height components, providing the point-to-point distance, dn, from point n−1 to point n:

$$dn=\{[Klat(lat_n-lat_{n-1})]^2+[Klon(\text{cosine}(lat_n))(lon_n-lon_{n-1})]^2+[hgt_n-hgt_{n-1}]^2\}^{1/2}$$

where Klat and Klon are the constants for converting latitude and longitude difference in degrees to linear measure in feet or meters. The point-to-point differences, dn, are then summed for the total distance traveled, $$\text{distance}=\Sigma_n dn$$

The quantity dn is computed only if measurable velocity occurred at that instant of time.

The height plot is simply plotting the height provided by the GPS/GLONASS receiver 16 against time provided by the receiver 16. The height plot provides an indication of vertical rate over the travel route.

The terrain plot is plotting the height versus horizontal distance traveled. The horizontal distance traveled is the summation of point-to-point horizontal travel according to:

$$\text{horizontal distance}=\Sigma_n horiz\ dn=\Sigma_n\{[Klat(lat_n-lat_{n-1})]^2+[Klon(\text{cosine }lat_n)(lon_n-lon_{n-1})]^2\}^{1/2}$$

The velocity plots are horizontal velocity, horizontal vertical velocity, and total velocity, each point-to-point horizontal distance traveled. The receiver provides north, east, and vertical velocity. The horizontal velocity is computed according to:

$$\text{horizontal velocity}=[\text{north velocity}]^2+[\text{east velocity}]^2]^{1/2}$$

The total velocity is computed according to:

$$\text{Total velocity}=[\text{horizontal velocity}]^2+[\text{vertical velocity}]^2]^{1/2}$$

The acceleration plots are plotting the horizontal component of acceleration perpendicular to the horizontal velocity vector, and acceleration component aligned with the total velocity vector, each versus horizontal distance traveled. The north, east, and vertical accelerations are computed in the ideal case according to:

$$\text{north acceleration}=\frac{(vN)_n-(vN)_{n-1}}{tn-tn-1}$$

Since the velocity may have some noise, and differentiation amplifies the noise, some noise smoothing may be necessary by using one or two prior points according to:

$$\text{north acceleration}=\frac{K_1(vN)_n-(vN)_{n-1}]}{t_n-t_{n-1}}+\frac{K_2[(vN)_{n-1}-(vN)_{n-2}]}{t_{n-1}-t_{n-2}}+\frac{K_3[(vN)_{n-2}-(vN)_{n-3}]}{t_{n-2}-t_{n-3}}$$

Where K1, K2, and K3 are constants selected to provide the best differentiation in presence of the velocity noise. More sophisticated algorithms may use second order terms. The east acceleration is computed similarly using E instead of N, and the vertical acceleration uses V instead of N. The horizontal acceleration is then computed according to:

horizontal component perpendicular = (horizontal acceleration)
(sine of the angle
between the horizontal
acceleration vector and
the horizontal velocity
vector)

The total acceleration is computed according to:

$$\text{total acceleration}=[(\text{horizontal acceleration})^2+(\text{Vertical acceleration})^2]^{1/2}$$

and the acceleration component aligned with the total velocity vector is computed according to:

acceleration component aligned = (total acceleration)
(cosine of the angle between
the total acceleration vector
and the total velocity vector)

The grade incline is computed according to: grade incline= $\cos^{-1}(\text{horiz } dn/dn)$.

The accumulated trip mileage is computed by summing the total distance traveled for the individual trips, $$\text{accumulated trip mileage}=\Sigma_{trips}(\text{distance})\text{trip}$$

The accumulated trip business tax deduction is computed by multiplying the accumulated trip mileage by the allowed cost per mile for business tax deductions. The accumulated trip expense deduction is computed by multiplying the accumulated trip mileage by the allowed cost per mile for travel expense reports.

As the computer 20 with display 21 generates travel route plots and user data banks based on the GPS/GLONASS 16 provided precise position and velocity data, these plots and data banks are in turn stored in the storage media 22. The computer 20 with display 21 can display the travel route plots and user data on the color display 21. The computer 20 with display 21 can make hard copy copies of the travel route plots and user data by sending the data on a coupled data bus 24, with a printer disconnect 25 to facilitate assembly/disassembly, to a suitable color printer 26, preferably laser or ink jet.

Batteries or other suitable power source 28 provides operating power for the system 10.

For man-mobile application, a color printer 26 would not normally be carried. The data would be stored in the storage media 22 for off-line retrieval by the color printer 26.

User commands are entered via the keyboard 30 and mouse (not shown) associated with the computer 20 with display 21, such as travel route start and travel route termination commands.

The GPS/GLONASS travel recorder system 10 may advantageously be employed on larger vehicles, e.g. ships may share the computer 20 with display 21, storage media 22, and color printer 26 with other users and usages. In turn, the GPS/GLONASS antenna 12, coax bus 14, GPS/GLONASS receiver 16, and data bus 18 may provide their precise position and velocity data to other user functions such guidance, navigation, and control.

In case of temporary GPS/GLONASS signal dropout, instructions in the storage media provides mathematical interpolation between the good precise position and velocity data points on each side of the dropout. In case of excessively long dropout the computer 20 with display 21 would notify the user on the display 21.

Some vehicles may have high dynamics associated with their operation. In these instances, the GPS/GLONASS receiver 16 may be integrated with inertial navigation system hardware to enable the combination to provide precise position and velocity route data in the presence of these high dynamics.

For aid to the user in deciding on subsequent route travel, a non-precise travel map can be pre-stored in the storage media 22 for retrieval as an overlay on the generated travel route horizontal plot on the color display 21 of the computer 20.

Figure 2:
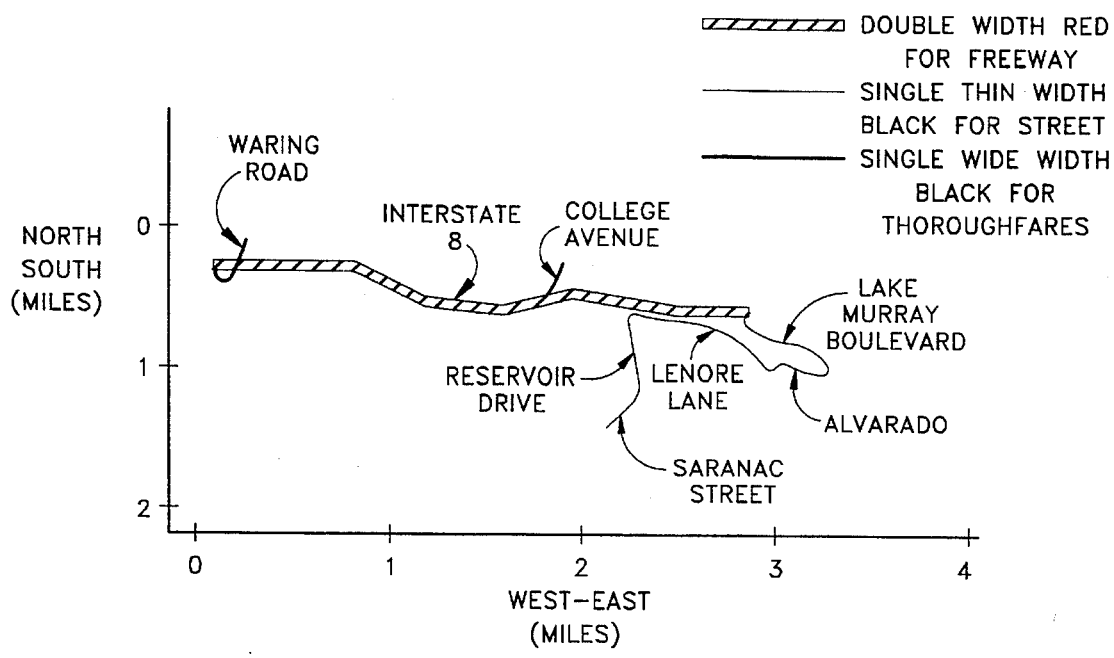
FIG. 2 is an example of a created travel route horizontal plot generated by the GPS/GLONASS utilizing receiver system of FIG. 1.

An example of a travel route horizontal plot as may appear on the computer 20 color display 21 and the color printer 26, and as may be stored in storage media 22, is shown in FIG. 2 for a travel initiated on access to Interstate 8 at Waring Road, off-ramp at Lake Murray Blvd. onto frontage road Alvarado, and thence south on Reservoir Drive to the present location, which travel route is located in the San Diego, Calif. area. Since the map data, such as street names, is identified by approximate latitude/longitude coordinates, they will not necessarily correspond exactly with the precise travel route plot.

Figure 3:
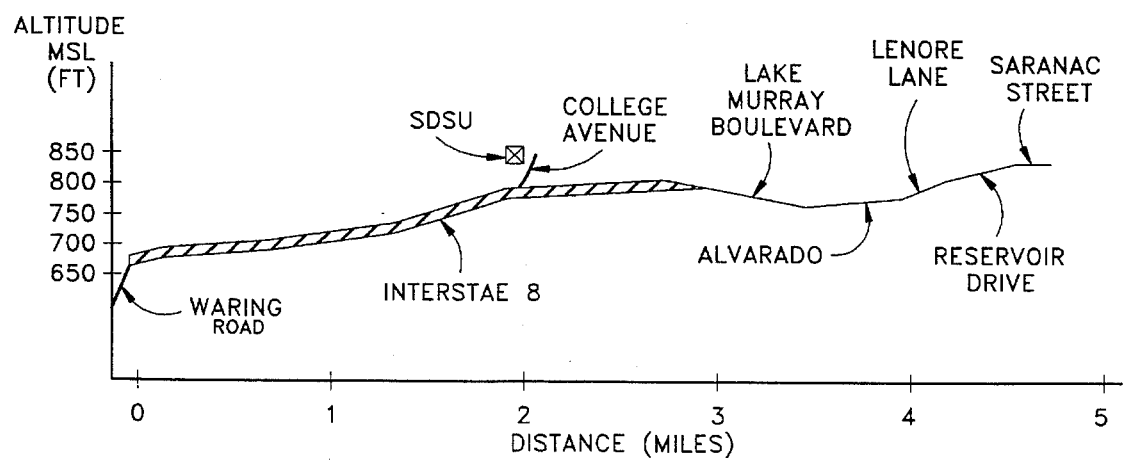
FIG. 3 is an example of a created travel route height plot for the travel route of FIG. 2 as generated by the GPS or GLONASS utilizing receiver system of FIG. 1.

An example of a travel route height plot as may appear on the computer 20 with color display 21 and on the color printer 26, and as may be stored in storage media 22, is shown in FIG. 3 for the same travel route as shown in FIG. 2.

An example of a user data record for income tax purposes as may appear on the computer 20 with display 21 and color printer 22, is shown in FIG. 4 for the same travel route as shown in FIG. 2.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Carrier mounted apparatus for providing a precise real time trip record for a carrier by generating and displaying the trip record based on GPS/GLONASS receiver provided periodic precise position, velocity, and time data which comprises:

GPS/GLONASS signal receiving antenna system means;

a GPS/GLONASS signal processing receiver coupled to the antenna system means, for providing signals representative of the carrier's precise latitude and longitude position, precise height above mean sea level, precise time, precise north, east and vertical velocity components;

data storage media:

computer means having a display and coupled to said data storage media and to the receiver for processing the GPS/GLONASS position and velocity representative signals in real time in accordance with algorithm process instructions stored in the data storage media to provide real time travel route plots for viewing on the computer display;

the data storage media also for storing previously obtained signals representative of approximate or precisely known latitude and longitude described local map features of interest to a user in a latitude-longitude associative memory for real-time retrieval and display;

the data storage media also storing symbology generating instructions, and a vector processing program;

the data storage media also for storing spread sheet instructions, to compute accumulated trip mileage and accumulated trip business tax deduction;

the data storage media also providing for real time storage of GPS/GLONASS carrier position and velocity representative signals, and data resulting from processing by said algorithm process instructions, for later retrieval and display, and printer means coupled to the computer means for providing, upon request, a hard copy of the travel route plots, the accumulated trip mileage and accumulated trip business tax deduction spread sheet from said spread sheet program instructions.

2. The apparatus, as defined in claim 1, wherein said storage media additionally comprising a horizontal precise position plot program with operator designated or by default automatically designated route symbology, as the travel route occurs, for storage of said position plot program in the data storage media and for later retrieval therefrom wherein:

the computer means uses the GPS/GLONASS receiver provided latitude and longitude representative signals to define a line segment vector, the width and color of said line segment vector being designated by function keys assigned on a keyboard of the computer and in accordance with an x-y plotting program stored in the data storage media to generate a real time plot of such each designated line segment vector as it occurs on the travel route, and the computer means also uses the x-y plotting program stored in the data storage media and as directed by actuatable functions keys on the keyboard for changing the scaling of the travel route display, and for shifting travel route display along the x and y axis.

3. The apparatus as defined in claim 2 wherein said data storage media further contains travel route vicinity locality names, street names, points of interest, and other pertinent data automatically displayed in response to the storage of signals associated by position to the carrier position in the storage media and wherein:

the storage media also contains stored local map features which are identified by their latitude-longitude locations in an associative memory of the storage media;

the computer means automatically requests from the associative memory those local map features which have stored latitude-longitude locations that are within the latitude-longitude limits of the current display boundaries of a travel plot, and the computer means also imprints the acquired local map features from the storage media on the current display in a stored format at the stored latitude longitude location for that feature.

4. The apparatus as defined in claim 1 wherein said computer means also provides a precise height plot with route symbology as a function of travel route distance, as the travel route occurs, and for storage for later retrieval and wherein:

the GPS/GLONASS receiver also provides signals representative of the height above mean sea level, and point-to-point latitude and longitude of the carrier along the travel route to the computer means;

the computer means uses storage media data to compute the horizontal travel route distance of the carrier according to the stored algorithms;

the computer means plots on its display point-to-point height data as a function of horizontal travel route distance of the carrier at the coincident GPS/GLONASS receiver provided times by using the vector processing program in the storage media, and the computer means uses the vector processing program in the storage media to plot on the display line vectors from point-to-point height data together with route symbology selected by function keys on the keyboard.

5. The apparatus as defined in claim 4 wherein said computer means and said stored data in said data storage means additionally provides travel route vicinity locality name, street names, points-of-interest, and other pertinent data on the basis of stored approximate position data;

the storage media also contains pre-stored local map features that are identified by their latitude-longitude location in an associative memory;

the computer means requests those local map features from said storage media which has stored latitude-longitude locations within the horizontal position display map field of view of the carrier's travel route latitude-longitude position, and the computer means imprints acquired local map features from the storage media on the current display in a stored alphanumeric or token format at the horizontal travel route distance associated with the carrier's latitude-longitude along the travel route at that time.

6. The apparatus as defined in claim 1 wherein said storage data means further accumulates data from said GPS/GLONASS receiver for providing trip mileage, and associated accumulative business travel tax deduction, and trip expense report;

the GPS/GLONASS receiver additionally provides precise real time point-to-point latitude and longitude position of the carrier and time, along the travel route of the carrier;

the computer means, according to stored instructions from the storage media, computes the travel route distance of the carrier according to algorithms for computing distance traveled and total distance stored in the storage media;

the computer means, according to stored instructions obtained from the storage media, computes accumulated trip business tax deduction and accumulated trip expense deduction, and the computer means in accordance with a spread sheet program utilizes instructions obtained from the storage media to provide on its display real time tabulation of the accumulated trip mileage and accumulated trip business tax deduction and accumulated trip expense deduction spread sheet generated data tables.

7. The apparatus as defined in claim 1 wherein said computer presents on said display from data stored in said storage media precise total velocity plots, horizontal velocity component plots and vertical velocity component plots as a function of horizontal travel route distance, as the travel route of the carrier occurs;

the GPS/GLONASS receiver provides to the computer means precise real time vertical velocity, east velocity, north velocity, latitude position and longitude position representative signals of the carrier and time;

the computer means, in accordance with stored instructions obtained from said data storage media, computes the total velocity from the square root of the sum of the squares of vertical, east and north velocities, and the horizontal velocity from the square root of the sum of the squares of east and north velocities;

the computer means, in accordance with instructions from said data storage media, also computes the horizontal travel route distance of the carrier according to the algorithms for computing horizontal distance stored in said data storage media, and the computer means in accordance with plotting program instructions obtained from said data storage media provides on its display real time plots of total velocity, vertical velocity, and horizontal velocity as a function of horizontal travel route distance of the carrier at the same coincident time.

8. The apparatus as defined in claim 7 wherein said display additionally displays travel route vicinity locality names, street names, and points-of-interest, and other pertinent data on the basis of stored approximate position data;

the computer means, in accordance with the vector processing program obtained from said data storage media, computes in real time the derivatives of velocities to obtain accelerations, and the inverse cosine of the point-to-point horizontal travel route distance divided by the point-to-point travel route distance to obtain grade inclines;

the computer means, in accordance with instructions obtained from said data storage media, in real time computes the horizontal component of acceleration perpendicular to the carrier horizontal velocity vector as a measure of centrifugal force on the carrier, and the component of acceleration aligned with the total velocity vector as a measure of acceleration of the vehicle;

the computer means, in accordance with said vector processor program obtained from said data storage media, plots on its display the aforesaid computer acceleration components and grade incline data versus horizontal travel route distance of the carrier;

the computer means accesses those local map features from said storage media having stored latitude-longitude locations within the horizontal position display map field of view of the carrier's travel route latitude-longitude, and automatically imprints such acquired local map features from said data storage media on the current computer display in a stored alpha-numeric or token format at the horizontal travel route distance associated with the carrier travel route latitude-longitude at that time.

9. The apparatus as defined in claim 1 wherein said carrier is a vehicle.

10. The apparatus as defined in claim 1 wherein said carrier is non-vehicular.

11. The apparatus as defined in claim 1 wherein said carrier is a marine vessel.

12. A method for providing a precise real time trip record for an object which includes the steps of:

receiving at the object radio signals from satellites of the GPS;

processing such radio signals to provide signals representative of the object's precise latitude and longitude position, the object's precise height above mean sea level, precise time, precise North, East, and vertical velocity components of the object;

processing the representative velocity and position signals to provide signals representative of a real time travel plot of the object;

providing a display showing real time travel plot of the object using said velocity and position signals;

computing accumulated travel route distance of the object, and accumulated travel mileage expense from said velocity and position signals;

obtaining, on the basis of precisely known latitude and longitude points on the travel route, local map features directly related to the latitude and longitude points on the travel route, the real time travel plot, and displaying these local map features adjacent to the displayed travel plot of the object, and producing a hard copy of accumulated trip mileage, accumulated trip business tax deductions and accumulated trip expense deduction spread sheet data tables using the computed accumulated travel route distance of the object and accumulated travel mileage expense.

13. The method of claim 12 which further includes the steps of:

defining a line segment vector, the line segment vector width and color being designated by function keys on a keyboard of a computer by using the GPS/GLONASS receiver provided latitude and longitude points, and in accordance with a vector processing program stored in the data storage media, generating a real time plot of each designated line segment vector as it occurs on the travel route, and shifting travel route display along the x and y axis using the vector processing program stored in the data storage media and as directed by actuatable function keys on the keyboard for changing the scaling of the travel route display.

14. The method as defined in claim 12 and including the further steps of:

obtaining signals representative of local map features associated with a latitude-longitude location that is within the latitude-longitude limits of the current display boundaries, and imprinting these acquired local map features on the current display in a stored alpha-numeric or token format at the stored latitude-longitude location for those features.

* * * * *